(12) United States Patent
Sekimoto (10) Patent No.: US 10,031,401 B2
(45) Date of Patent: Jul. 24, 2018

(54) CAMERA MODULE AND ELECTRONIC DEVICE

(71) Applicant: Sharp Kabushiki Kaisha, Sakai, Osaka (JP)

(72) Inventor: Yoshihiro Sekimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/309,299

(22) PCT Filed: Mar. 17, 2015

(86) PCT No.: PCT/JP2015/057952
§ 371 (c)(1),
(2) Date: Nov. 7, 2016

(87) PCT Pub. No.: WO2015/178083
PCT Pub. Date: Nov. 26, 2015

(65) Prior Publication Data
US 2017/0219914 A1    Aug. 3, 2017

(30) Foreign Application Priority Data

May 19, 2014  (JP) ................................. 2014-103767

(51) Int. Cl.
*G03B 13/36*  (2006.01)
*G02B 7/09*  (2006.01)
*H04N 5/225*  (2006.01)

(52) U.S. Cl.
CPC ............. *G03B 13/36* (2013.01); *G02B 7/09* (2013.01); *H04N 5/2257* (2013.01)

(58) Field of Classification Search
CPC ......... G03B 13/36; G02B 7/09; H04N 5/2257
USPC .......................... 396/52–55, 133; 348/208.12
See application file for complete search history.

(56) References Cited

U.S. PATENT DOCUMENTS

| | | | |
|---|---|---|---|
| 5,391,866 A | 2/1995 | Hoshino et al. | |
| 2008/0031609 A1* | 2/2008 | Rukes | G03B 13/32 396/89 |
| 2008/0055753 A1 | 3/2008 | Takahashi et al. | |
| 2010/0322612 A1 | 12/2010 | Tsuda et al. | |
| 2011/0043684 A1 | 2/2011 | Fujita et al. | |

(Continued)

FOREIGN PATENT DOCUMENTS

| | | |
|---|---|---|
| JP | 05-281449 A | 10/1993 |
| JP | 2008-040017 A | 2/2008 |
| JP | 2008-064937 A | 3/2008 |

(Continued)

OTHER PUBLICATIONS

Translation of 2009-115895.*

(Continued)

*Primary Examiner* — Noam Reisner
(74) *Attorney, Agent, or Firm* — Keating & Bennett, LLP (57) ABSTRACT

A camera module that does not make a rasping noise even when being subjected to a vibration by a source of vibration is provided. A hall element that detects a displacement of an imaging lens (1) is disposed therein. In the case where the hall element detects a displacement of the imaging lens (1) that is not based on drive by a lens-driving device (5), the lens-driving device (5) drives the imaging lens (1) so as to reduce the displacement.

6 Claims, 7 Drawing Sheets

(56) References Cited

U.S. PATENT DOCUMENTS

2013/0169832 A1* 7/2013 Park .................. H04N 5/232
348/208.2
2015/0331251 A1* 11/2015 Hu .................. G02B 27/646
359/824

FOREIGN PATENT DOCUMENTS

| JP | 2009-115895 A | 5/2009 |
| JP | 2009-182680 A | 8/2009 |
| JP | 2011-022562 A | 2/2011 |
| JP | 2013-210420 A | 10/2013 |
| WO | 2008/029944 A1 | 3/2008 |

OTHER PUBLICATIONS

Translation of 2009-182680.*
Official Communication issued in International Patent Application No. PCT/JP2015/057952, dated Jun. 16, 2015.

* cited by examiner

FIG. 1

40: CAMERA MODULE
50: CELLULAR PHONE
51: HOUSING
60: VIBRATOR (SOURCE OF VIBRATION)

1: IMAGING LENS
2: LENS BARREL
3: ADHESIVE
4: LENS HOLDER
4a: PROTRUSION
5: LENS-DRIVING DEVICE
6: IMAGING ELEMENT
7: SUBSTRATE
8: SENSOR COVER
8a: PROTRUSION
9: GLASS SUBSTRATE
10: IMAGING DEVICE
12a: AF SPRING
12b: AF SPRING
13: BASE
13a: OPENING
14: AF COIL
15: COVER
16: MAGNET (FOR DRIVING)
17: ADHESIVE
40: CAMERA MODULE

FIG. 4

1: IMAGING LENS
2: LENS BARREL
3: ADHESIVE
4: LENS HOLDER
12c: MOVEABLE-SIDE STATIONARY END
12d: FIXATION-SIDE END
12e: FLEXIBLE PORTION
13: BASE
15: COVER
16: MAGNET (FOR DRIVING)
18: MAGNET (FOR DISPLACEMENT DETECTION)
19: HALL ELEMENT
20: FPC
40: CAMERA MODULE

FIG. 5

1: IMAGING LENS
2: LENS BARREL
3: ADHESIVE
4: LENS HOLDER
4a: PROTRUSION
5: LENS-DRIVING DEVICE
6: IMAGING ELEMENT
7: SUBSTRATE
8: SENSOR COVER
8a: PROTRUSION
9: GLASS SUBSTRATE
10: IMAGING DEVICE
12a: AF SPRING
12b: AF SPRING
13: BASE
13a: OPENING
14: AF COIL
15: COVER
16: MAGNET (FOR DRIVING)
17: ADHESIVE
40: CAMERA MODULE

FIG. 6

1: IMAGING LENS
2: LENS BARREL
3: ADHESIVE
4: LENS HOLDER
12c: MOVEABLE-SIDE STATIONARY END
12d: FIXATION-SIDE END
12e: FLEXIBLE PORTION
13: BASE
15: COVER
16: MAGNET (FOR DRIVING)
18: MAGNET (FOR DISPLACEMENT DETECTION)
19: HALL ELEMENT
20: FPC
40: CAMERA MODULE

1: IMAGING LENS
2: LENS BARREL
4: LENS HOLDER
13: BASE
14: AF COIL
15: COVER
16: MAGNET (FOR DRIVING)
18: MAGNET (FOR DISPLACEMENT DETECTION)
19: HALL ELEMENT
20: FPC
21: INTERMEDIATE HOLDING MEMBER
22: SUSPENSION WIRE
23: OIS COIL
40: CAMERA MODULE

CAMERA MODULE AND ELECTRONIC DEVICE

TECHNICAL FIELD

The present invention relates to a camera module with an autofocus function and an electronic device, such as a cellular phone, equipped with the camera module. In particular, the present invention relates to an autofocus camera module that enables feedback control and an electronic device including the autofocus camera module.

BACKGROUND ART

In recent years, a model incorporating a camera module in a cellular phone body has been used in the majority of cellular phones. Such camera modules need to be accommodated in housings of cellular phones and are accordingly required to have their size and weight reduced more than in the case of digital cameras.

There are an extremely large number of examples in which, among such camera modules, a camera module whose lens-driving device serves an autofocus function is installed in an electronic device such as a cellular phone. Lens-driving devices are divided into various types: a stepping motor use type, a piezoelectric element use type, and VCM (Voice Coil Motor) use type and are in the marketplace.

Camera modules with an autofocus (AF) function, as described above, are taken for granted, and in this circumstance, there are recently some suggestions to further improve the autofocus function. According to one of the suggestions, feedback control actuates the autofocus.

A focus control circuit used in a camera module that performs an autofocus action while implementing feedback control is disclosed in PTL 1. According to PTL 1, the output signals of a position-detecting element for detecting the position of a lens are used to implement feedback control on the basis of a difference from a target position of the lens that is set from the outside, and the accuracy of focus can be improved.

Achieving the autofocus action requires a lens-driving device. The lens is typically supported in some way so as to be movable. The movable range of the lens is limited, and there is a member (stopper) for limiting the movable range. Accordingly, there is a problem in that a collision of a movable portion including the lens with the stopper makes a collision noise. An example of a method for reducing the collision noise is disclosed in PTL 2. According to PTL 2, an elastic body is used as a member serving as the stopper to reduce the collision noise. Another method for reducing the collision noise is disclosed in PTL 3. According to PTL 3, the range in which a lens unit is movable is divided into the predetermined number of divided ranges, and the collision noise is reduced in a manner in which the lens unit is caused to move a unit movement amount with a waiting time for suppression of vibration set. PTL 2 discloses a mechanical countermeasure, and PTL 3 discloses a countermeasure relating to an aspect of control.

CITATION LIST

Patent Literature

PTL 1: Japanese Unexamined Patent Application Publication No. 2011-22562 (published on Feb. 3, 2011)

PTL 2: Japanese Unexamined Patent Application Publication No. 2008-40017 (published on Feb. 21, 2008)

PTL 3: Japanese Unexamined Patent Application Publication No. 2008-64937 (published on Mar. 21, 2008)

SUMMARY OF INVENTION

Technical Problem

Such a collision noise is made not only during the autofocus action. In recent years, a camera module, electronic circuitry, a vibrator, a speaker, a microphone, and so on are densely packed in portable equipment such as a smart phone, and it is necessary for sources of vibration, such as the vibrator and the speaker, to be arranged so as to be close to the camera module. In the case where the sources of vibration are thus arranged so as to be close to the camera module, a vibration as a disturbance is transmitted to the camera module, and in some cases, the movable portion including the lens is moved. There is a possibility that the disturbance vibration will cause the movable portion including the lens to collide with the stopper, thereby making a collision noise.

In the majority of autofocus camera modules using VCM as a lens-driving device, a movable portion including a lens is subjected to a preload of a spring force and thereby pressed against a mechanical end (stopper) on the infinity side. In this case, an additional vibration due to an external force exceeding the preload slightly raises the movable portion from the mechanical end. In some cases of a periodic disturbance vibration, the movable portion is raised from the mechanical end and collides with the mechanical end, creating so-called chatter vibration. The chatter vibration makes a chatter noise, which is rasping.

The focus control circuit in PTL 1 is a circuit for feedback control on the autofocus action. PTL 1 does not disclose the collision noise nor the chatter noise at all, and no one can easily imagine that the focus control circuit is applied to another use other than the autofocus action.

Also, the countermeasure against the collision noise in PTL 2 targets the autofocus action. PTL 2 does not disclose a countermeasure against a noise due to the disturbance vibration. The countermeasure in PTL 2 is a mechanical countermeasure, which may suppress the disturbance vibration to a certain extent but is not a countermeasure for avoiding the collision. Accordingly, the collision makes a collision noise although there is the effect of the suppression. Since the elastic body serves as the stopper, the effect of limiting the movable range is subtle, and there is a possibility that the movable range will vary. There is also a high risk of deformation of the elastic body due to an impact when dropping. In the case where a disturbance vibration at the resonance frequency of the elastic body is created, there is a risk of the growth of the vibration. Thus, the mechanical countermeasure has a subtle noise-reducing effect and carries a risk of various adverse effects.

Also, the countermeasure against the collision noise in PTL 3 targets the autofocus action. PTL 3 does not disclose a countermeasure against a noise due to the disturbance vibration. The countermeasure in PTL 3, in which a movable amount is closely divided for the movement, cannot be a countermeasure against the disturbance vibration.

A collision noise and a chatter noise due to the above disturbance vibration are physical phenomena. A noise itself is reduced in a manner in which the speed of the collision is decreased, or the area of a portion to collide is decreased. However, since a physical phenomenon such as a collision or chatter occurs, the occurrence of the noise cannot be eliminated. Ideally, the movable portion is prevented from vibrating when being subjected to the disturbance vibration to prevent the occurrence of the noise.

The present invention has been accomplished in view of the conventional problems, and an object of the present invention is to provide a camera module and an electronic device that inhibit the movable portion inside the camera module from colliding with a stationary portion such as a stopper and from starting the chatter vibration and do not make a rasping noise even in the case where the camera module with an autofocus function and the electronic device including the camera module are subjected to a vibration by a source of vibration such as a vibrator or a speaker.

Solution to Problem

To solve the above problems, a camera module according to an aspect of the present invention is a camera module including an imaging lens, a lens-driving device that drives the imaging lens in an optical axis direction, and a displacement detector that detects a displacement of the imaging lens. In a case where the displacement detector detects a displacement, with respect to a target position, of the imaging lens which displacement is not based on the drive by the lens-driving device which drive causes the imaging lens to move to the target position, the lens-driving device drives the imaging lens so as to reduce the displacement, with respect to the target position, of the imaging lens which displacement is not based on the drive by the lens-driving device which drive causes the imaging lens to move to the target position.

Advantageous Effects of Invention

In the camera module with an autofocus function that can be provided according to an aspect of the present invention, the movable portion inside the camera module is inhibited from colliding with the stationary portion, such as a stopper, and inhibited from starting the chatter vibration, and a rasping noise is not made even in the case where the camera module is subjected to the vibration by the source of vibration such as a vibrator or a speaker.

DESCRIPTION OF EMBODIMENTS

[First Embodiment]

Figure 1:
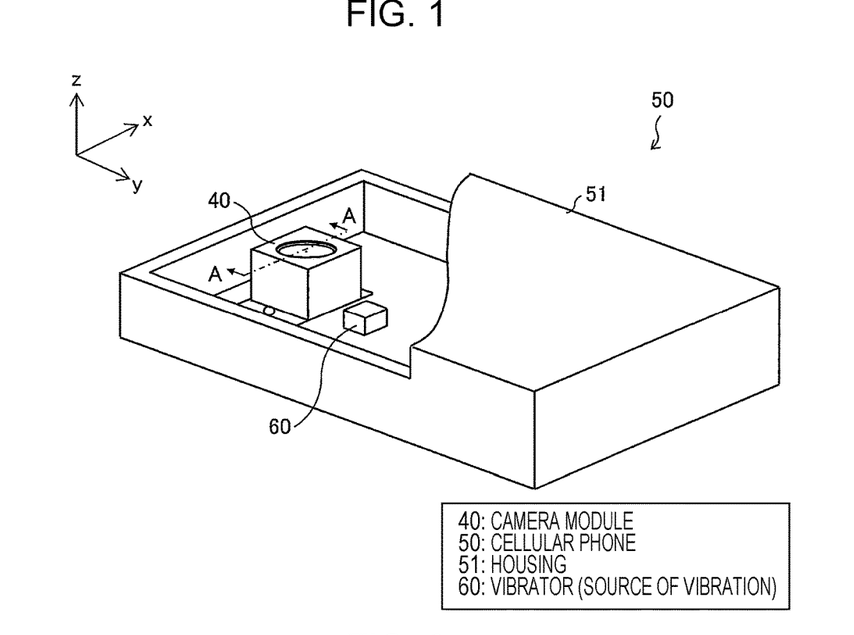
FIG. 1 is a partially cutaway perspective view of an electronic device equipped with a camera module according to a first embodiment of the present invention.
Figure 2:
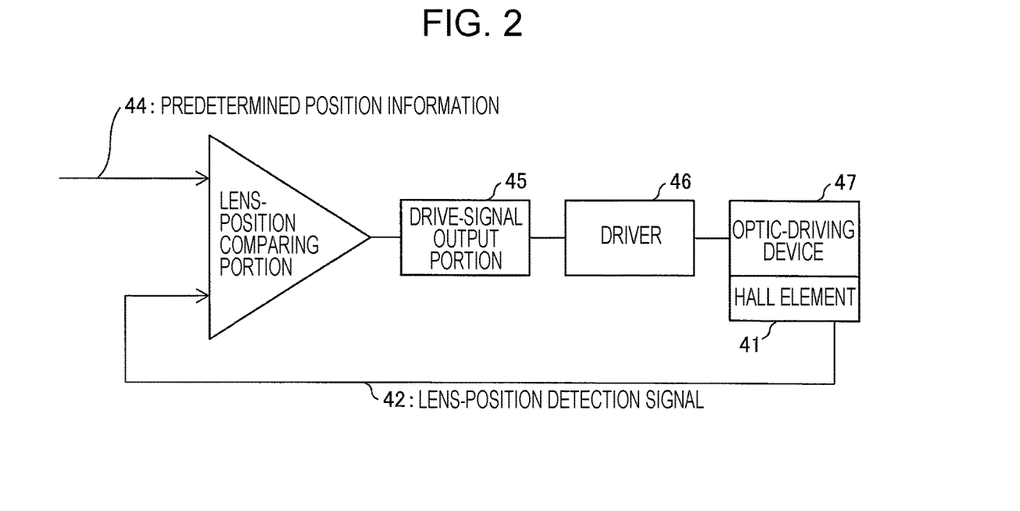
FIG. 2 is a schematic view of a feedback control system using displacement detection signals that is included in the camera module according to the first embodiment of the present invention.
Figure 3:
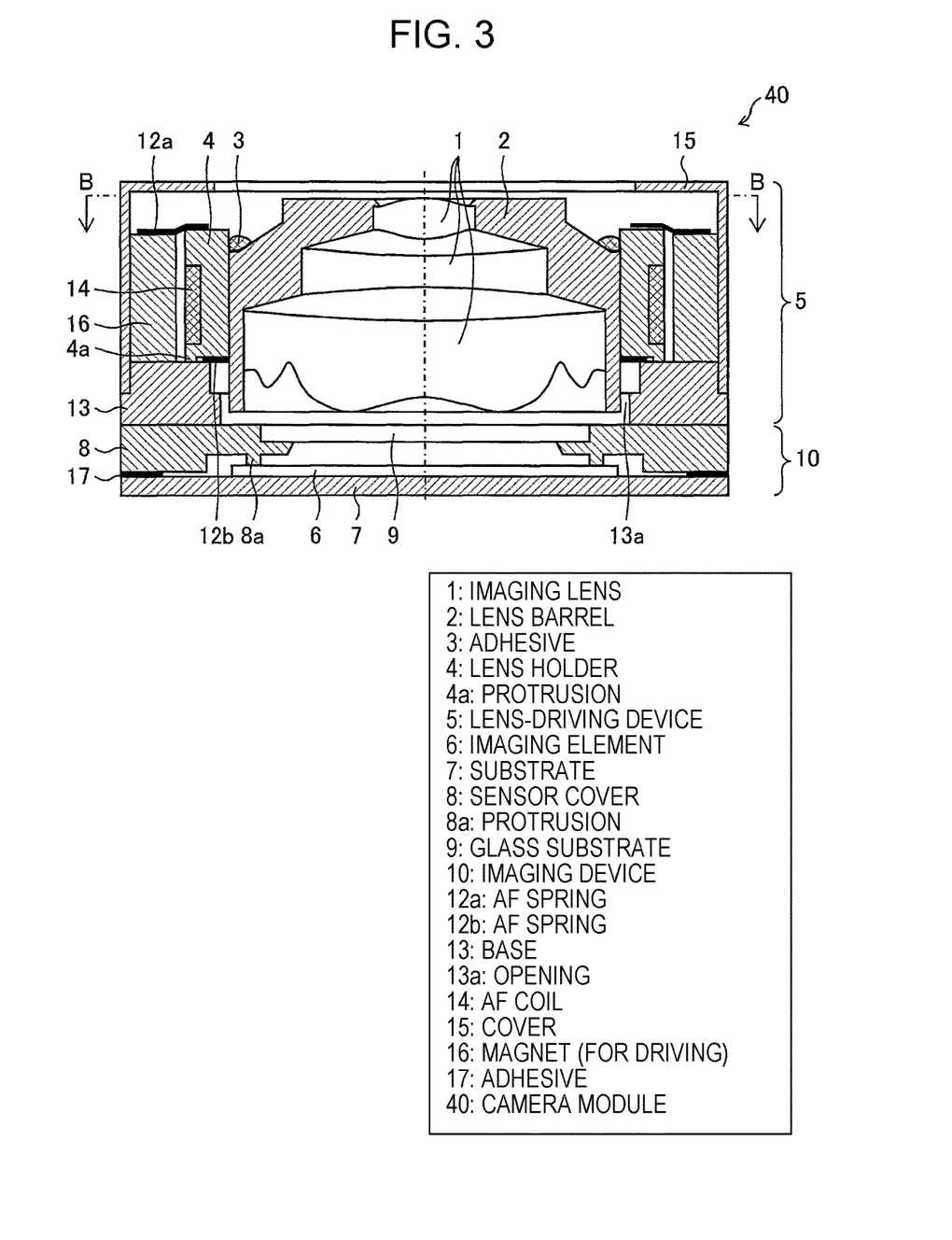
FIG. 3 is a sectional view of the camera module inside the electronic device in FIG. 1 taken along line A-A.
Figure 4:
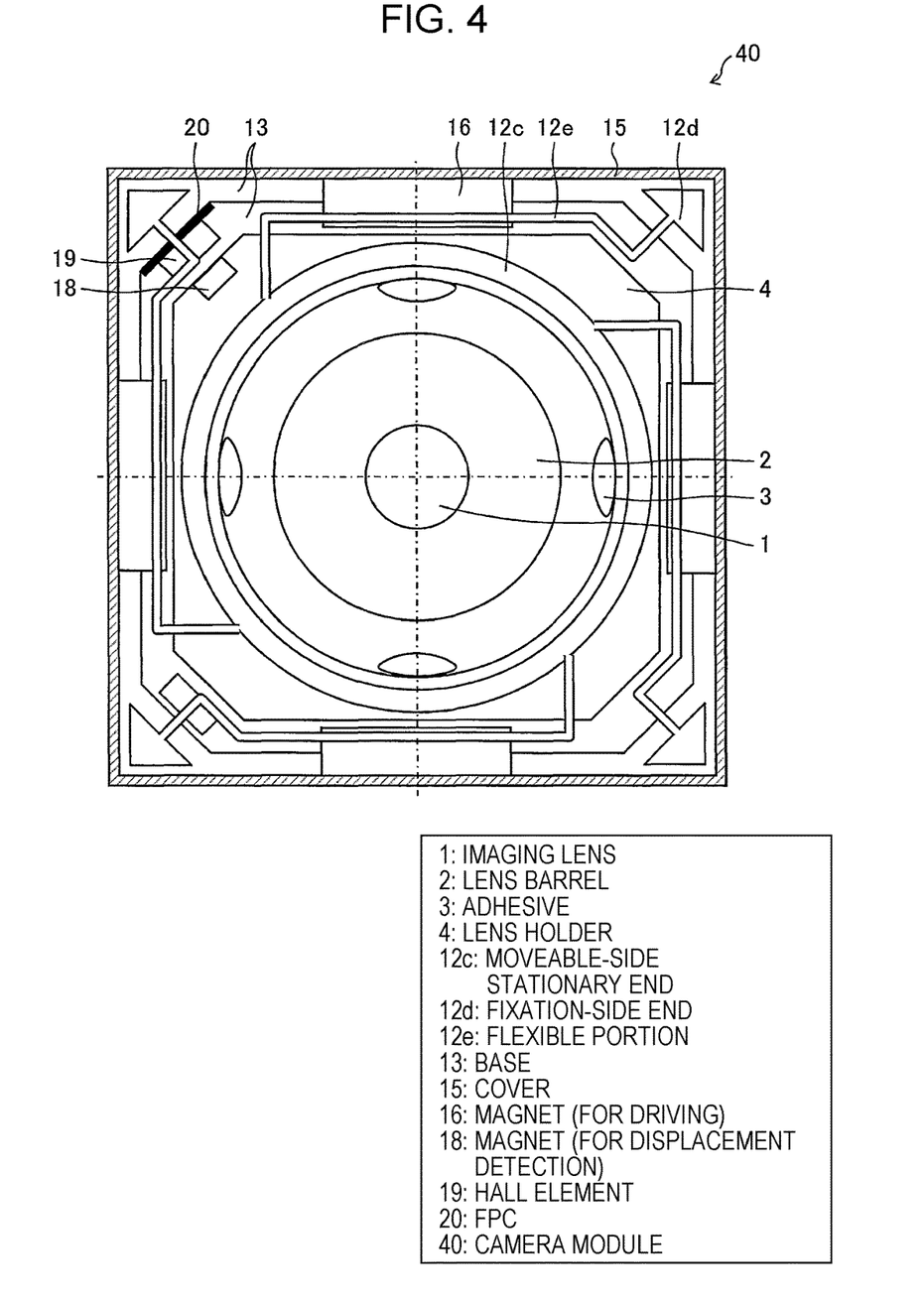
FIG. 4 is a sectional view of the camera module in FIG. 3 taken along line B-B.

A camera module and an electronic device according to an embodiment (first embodiment) of the present invention will be described with reference to FIG. 1 to FIG. 4. FIG. 1 is a partially cutaway perspective view of a smart-phone type cellular phone 50 (electronic device) according to the first embodiment of the present invention. In FIG. 1, part of a housing 51 is cut to sight the inside of the housing 51 so that the housing 51 of the cellular phone 50, a source of vibration typified by a vibrator 60, and a camera module 40 are visible, and the other components having a little relevance to the present invention are not illustrated. FIG. 2 is a schematic view of a feedback control system using displacement detection signals. FIG. 3 is a sectional view of the camera module inside the electronic device in FIG. 1 taken along line A-A. FIG. 4 is a sectional view of the camera module in FIG. 3 taken along line B-B.

In the following description, as illustrated in FIG. 1, three directions that are perpendicular to each other are the X direction, the Y direction, and the Z direction, the Z direction coincides with the direction (optical axis direction) of the optical axis of light incident on the camera module disposed in the cellular phone 50, the X direction is a first direction perpendicular to the optical axis direction, and the Y direction is a second direction perpendicular to the optical axis direction and the X direction.

The smart-phone type cellular phone 50 according to the embodiment includes the camera module 40 and the source of vibration typified by the vibrator 60 inside the housing 51, which is an outer shell.

(Feedback Control Using Displacement Detection Signal)

The feedback control will be described with reference to FIG. 2. The detailed structure of the camera module is described later. The camera module according to the present invention includes a hall element 41 serving as a displacement detecting unit (displacement detector) that detects a displacement of the imaging lens in the optical axis direction. A lens-position comparing portion 43 compares lens-position detection signals 42 detected by the hall element 41 with predetermined position information 44. The predetermined position information 44 is information about the target position to which the imaging lens is to be moved when an autofocus action is performed and is information about the initial position at which the imaging lens is not moved when the autofocus action is not performed. A drive-signal output portion 45 outputs drive signals on the basis of differential signals obtained from the lens-position comparing portion 43. The drive signals cause a driver 46 to operate and an optic-driving device 47 is controlled accordingly. Thus, feedback about positional information signals enables control for the target position.

Such control enables rapid position control aiming at the target position when the autofocus action is performed and enables a transient response vibration on arrival at the target position to be suppressed. When the autofocus action is not performed, the target position means that the position does not vary from the initial position. In the case where the disturbance vibration causes the movable portion to start moving, the optic-driving device 47 implements control for suppressing the movement. Thus, the collision noise and the chatter noise due to the disturbance vibration can be inhibited from occurring.

(Camera Module)

The detail of the camera module 40 will be described with reference to FIG. 3 and FIG. 4. The camera module 40 includes an imaging lens 1, a lens barrel 2 that contains the imaging lens 1, and a lens holder 4 that holds the lens barrel 2 in the inside thereof and is secured with an adhesive 3. In the camera module 40, a lens-driving device 5 that drives the imaging lens 1 in the optical axis direction (Z direction) and an imaging device 10 are stacked in the optical axis direction, and the imaging device 10 includes an imaging element 6, for photoelectric conversion of light passing through the imaging lens 1, having an imaging surface and disposed on a substrate 7, a sensor cover 8 that covers the imaging surface of the imaging element 6, and a glass substrate 9. In the following description, the side of the imaging lens 1 is represented as the upper side, and the side of the imaging device 10 is represented as the lower side for convenience.

The lens-driving device 5 has an active state in which the lens-driving device 5 drives the imaging lens 1 on the basis of the autofocus action or a manual focus action and a dormant state in which the lens-driving device 5 does not drive the imaging lens 1. The lens-driving device 5 moves the imaging lens 1 in the optical axis direction in the active state. When the lens-driving device 5 is in the dormant state, the imaging lens 1 is located at the initial position. In the camera module 40 according to the embodiment, when the imaging lens 1 is located at the initial position, the lens holder 4 is in contact with a base 13 (stationary portion) described later.

The lens holder 4 is a component for securing the lens barrel 2 with the adhesive 3. The lens holder 4 is supported by an AF spring 12a (elastic body) from above and supported by an AF spring 12b (elastic body) from below so as to be movable with respect to the base 13 in the Z direction. The AF spring 12a on the upper side may be secured to the ceiling of a columnar portion of the base 13 that protrudes up to the height of the AF spring 12a. Alternatively, a columnar body separated from the base 13 may be stacked on the base 13, and the AF spring 12a may be secured to the ceiling of the columnar body. The lens holder 4 secures an AF coil 14 to the outer circumferential portion thereof. A protrusion 4a of the lens holder 4 is in contact with the base 13 at the mechanical end (reference position in the movable range on the side of the imaging element 6, initial position) on the infinity side in a movable range in the Z direction. A cover 15 is disposed on the base 13 so as to surround the whole of the lens-driving device 5. Magnets 16 are disposed on the inner wall of the cover 15 so as to face the AF coil 14. The cover 15 may be made of a magnetic material such as electromagnetic soft iron to have a function as a yoke.

The imaging device 10 is formed of the substrate 7, the imaging element 6, the sensor cover 8, the glass substrate 9, and so on, and these are stacked in the optical axis direction. A protruding portion 8a (protrusion 8a) of the sensor cover 8 on the lower side serves as a reference surface and is arranged so as to be in contact with the imaging element 6. A space formed between the sensor cover 8 and the substrate 7 due to tolerance is filled with an adhesive 17. Thus, the sensor cover 8 and the imaging element 6 are arranged so as to be in contact with each other, and accordingly, the height of the imaging lens with respect to the imaging element 6 can be accurately set. The reason is described later. The sensor cover 8 may be formed integrally with the base 13 of the lens-driving device 5.

The AF spring 12a on the upper side is formed of a moveable-side stationary end 12c that is secured to the lens holder 4, fixation-side ends 12d that are secured to stationary portions of, for example, the base 13, and flexible portions 12e with flexibility. The AF spring 12b on the lower side has the same structure, which is not illustrated. The shape, however, is not necessarily identical. The AF springs 12a and 12b may be used as energizing units for the AF coil 14. For example, in the case where only the AF spring 12a on the upper side is used as the energizing unit, the moveable-side stationary end 12c may be divided into two pieces, and both ends of the AF coil 14 may be connected to respective portions electrically isolated, although this is not illustrated.

As can be seen in FIG. 4, a magnet 18 for displacement detection is secured to a corner portion of the lens holder 4. A hall element 19 is secured to the base 13 with FPC 20 interposed therebetween so as to face the magnet 18. The FPC 20 is used as an energizing unit for the hall element 19. Another end of the FPC 20 is connected to, for example, the substrate 7 of the camera module. When the lens holder 4 is displaced in the optical axis direction, the distribution of magnetic flux incident on the hall element 19 changes, and the hall element 19 can detect the displacement of the lens holder 4.

The magnet 18 for displacement detection and the hall element 19 are located at substantially the middle position between the two adjoining magnets 16. The reason is to avoid magnetic flux entering the hall element 19 from the magnets 16 for driving as much as possible. The arrangement illustrated is not a limitation, provided that this effect is at an acceptable level. The magnet 18 for displacement detection may be disposed on the side of the base 13, and the hall element 19 may be disposed on the side of the lens holder 4. Such arrangement, however, requires a wire (typically, four terminals) extending to the hall element on the side of the lens holder 4, which is a movable portion, and accordingly, a wiring operation is difficult. However, since the wiring operation is not impossible, even this arrangement enables energization in the case where the number of wires is increased, for example, in a manner in which each AF spring is divided into pieces that correspond to the flexible portions 12e and are electrically isolated. The hall element 19 may be arranged on the side of the lens holder 4 so as to face one of the magnets 16 for driving. In this case, the magnet 18 for displacement detection is unnecessary, and accordingly, the number of components can be reduced.

Part of the lens barrel 2 enters the inside of an opening 13a of the base 13. This structure is typical because it is difficult to sufficiently increase the flange back (distance from the lower end surface of the lens barrel 2 to a surface of the imaging element 6) of the imaging lens 1.

No screws are formed on the lens barrel 2 nor the lens holder 4. The lens barrel 2 is secured so as to be located at a predetermined position in a state in which the lens holder 4 is located at the mechanical end on the infinity side. A space of about 10 um (micrometer) is formed between the lens barrel 2 and the sensor cover 8. In order to set the position of the lens barrel 2 with the space of about 10 um thus formed, the lens barrel 2 may be attached while the position thereof is maintained by using a jig. The position of the lens barrel 2 in the height direction is set by using the jig with reference to a position corresponding to the position of the upper surface of the imaging element 6. Accordingly, in the case where the sensor cover 8 is disposed on the imaging element 6 and the lens-driving device 5 is disposed on the sensor cover 8, the position of the lens barrel 2 in the height direction with respect to the imaging element 6 can be accurately set.

The position at which the lens barrel 2 is attached to the lens holder 4 will now be described. Regarding the position of the imaging lens 1, the distance from the surface of the imaging element 6 is preferably determined such that the imaging lens 1 is in focus at the mechanical end on the infinity side. However, the imaging lens 1 has position tolerance with respect to the lens barrel 2, the sensor cover 8 has thickness tolerance, and there are variations in components. Accordingly, in the case where the position is set by using mechanical contact without focus adjustment, an error occurs. Even when an error occurs, it is necessary to find the position of focus within the range of a stroke of the lens-driving device 5, and accordingly, it is necessary to dispose the imaging lens 1 at a position slightly away from the median of the designed position of focus toward the side of the imaging element 6. This shift amount is called over infinity. In the case where the over infinity is determined to be large, the stroke of the lens-driving device 5 increases accordingly. For this reason, the over infinity needs to be minimized. Summing up the above tolerances, an appropriate amount of the over infinity is about 25 um. This value, however, is affected by the production tolerance or assembly tolerance of components, and accordingly, the amount is preferably determined to be as small as possible depending on the actual conditions.

In the structure of the present invention, the reference surface of the sensor cover 8 on the lower side is in direct contact with the imaging element 6, the accuracy of the thickness of the sensor cover 8 is increased, and the position of the lens barrel 2 is accurately set with respect to the upper surface of the sensor cover 8 (in other words, with respect to the lower surface of the lens-driving device 5). It can be said that, for this reason, the amount of the over infinity is only about 25 um. In an example in FIG. 3, the lens barrel 2 is disposed at a position 25 um away from the position of focus on a subject at infinity toward the side of the imaging element 6, and in this state, there is a space between the sensor cover 8 and the lens barrel 2.

(Electronic Device)

The case where the camera module 40 is secured to (installed into) the cellular phone 50 will now be described. The source of vibration typified by the vibrator 60 is disposed near the camera module 40. The source of vibration may be a speaker or a microphone. In some cases, a plurality of the sources of vibration are included.

An example in which the vibrator 60 (source of vibration) is secured near the camera module 40 is described. When the vibrator 60 vibrates, for example, during an incoming call, the vibration is transmitted also to the camera module 40 via the housing 51. When the camera module 40 is subjected to such a disturbance vibration, the movable portion including the imaging lens 1 is subjected to inertial force and tries to move. In the case of the embodiment, when the camera module does not operate, that is, in a state in which an electric current is not applied to the AF coil 14 (dormant state, a state in which the imaging lens 1 is located at the initial position), the protrusion 4a of the lens holder 4 is in contact with the base 13 and is subjected to a contact pressure due to a spring force (preload) applied by the AF spring 12a or 12b. However, when the disturbance vibration is larger than a certain value, the inertial force overcomes the preload, and the lens holder 4 tries to rise from the base 13. In the case where there is no countermeasure, the lens holder rises. When the inertial force disappears, the lens holder 4 comes in contact with the base 13 again. A chatter vibration occurs as a result of such movement being repeated. In the embodiment, however, the magnet 18 for displacement detection and the hall element 19 are disposed therein as displacement detecting units, and the displacement is always detected while the camera module does not operate. Thus, the displacement of the imaging lens 1 that is not based on the drive by the lens-driving device 5 is detected. Accordingly, when the vibrator 60 vibrates, and the lens holder 4 tries to rise from the base 13, feedback control is implemented such that displacement detection signals do not vary, that is, so as to try to eliminate variations in the signals, and an electric current is applied to the AF coil 14 to obtain a driving force that increases the contact pressure. Accordingly, the lens holder 4 is inhibited from rising, and the chatter noise can be consequently inhibited from occurring.

Actuating signals to the vibrator 60 may trigger a feedback system including the displacement detecting units. Power consumption increases through continuous operation of the feedback system under the condition in which the cellular phone 50 receives no incoming call. In contrast, the power consumption of the feedback system on standby can be decreased in a manner in which the actuating signals to the vibrator 60 trigger the feedback system.

(Effect of Embodiment)

Thus, the embodiment includes the units for detecting a displacement in the optical axis direction, and feedback control can be implemented such that the position of the movable portion becomes a predetermined position. Accordingly, when the movable portion inside the camera module is subjected to the disturbance vibration from the source of vibration such as a vibrator and is about to be displaced, a driving force in the direction from which the displacement is suppressed is created, even when the camera does not operate. Consequently, an electronic device in which there is no displacement due to the disturbance vibration, that is, no chatter noise is made can be achieved.

[Second Embodiment]

Figure 5:
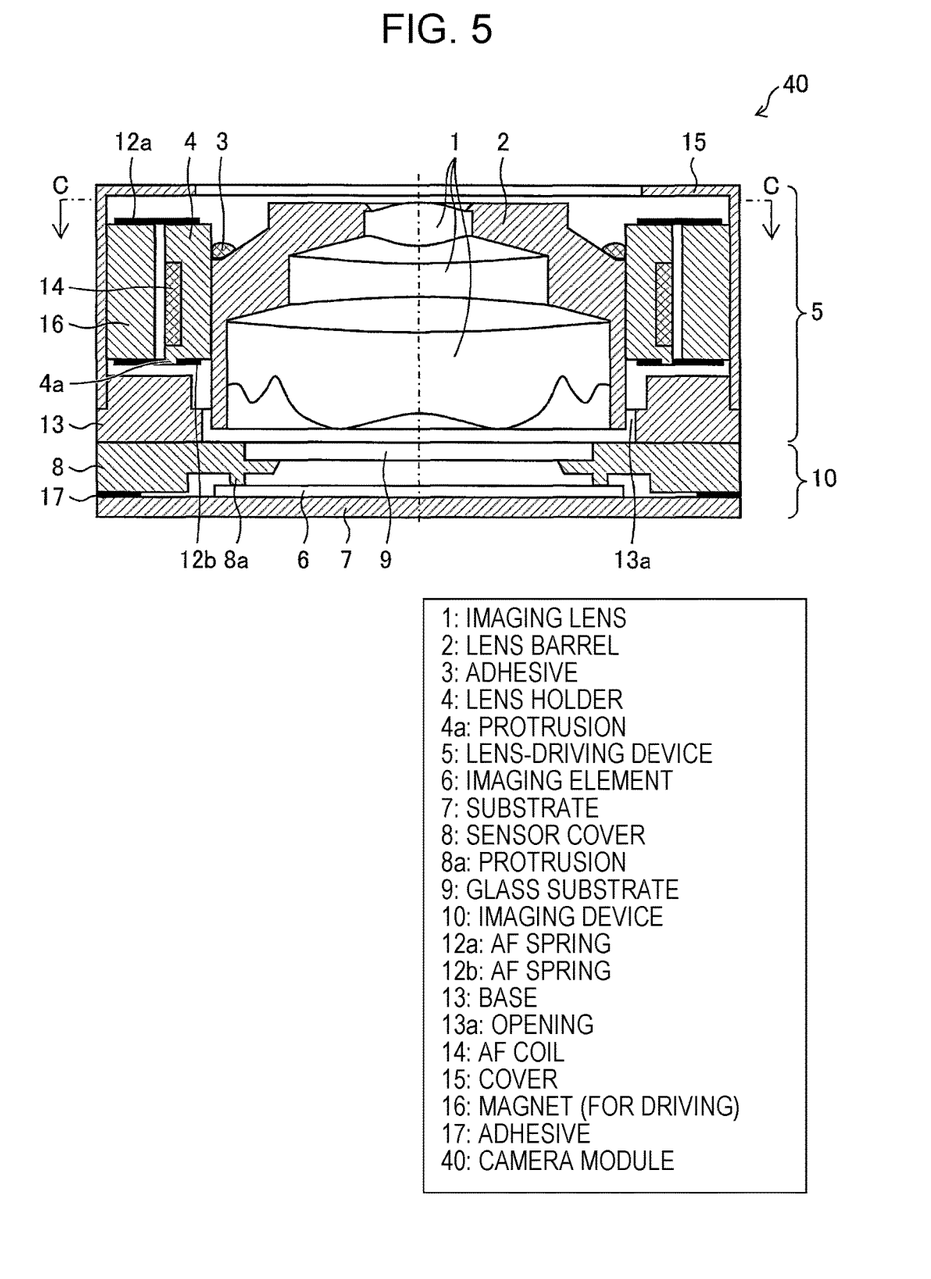
FIG. 5 is a sectional view of a camera module according to a second embodiment of the present invention as in FIG. 3.
Figure 6:
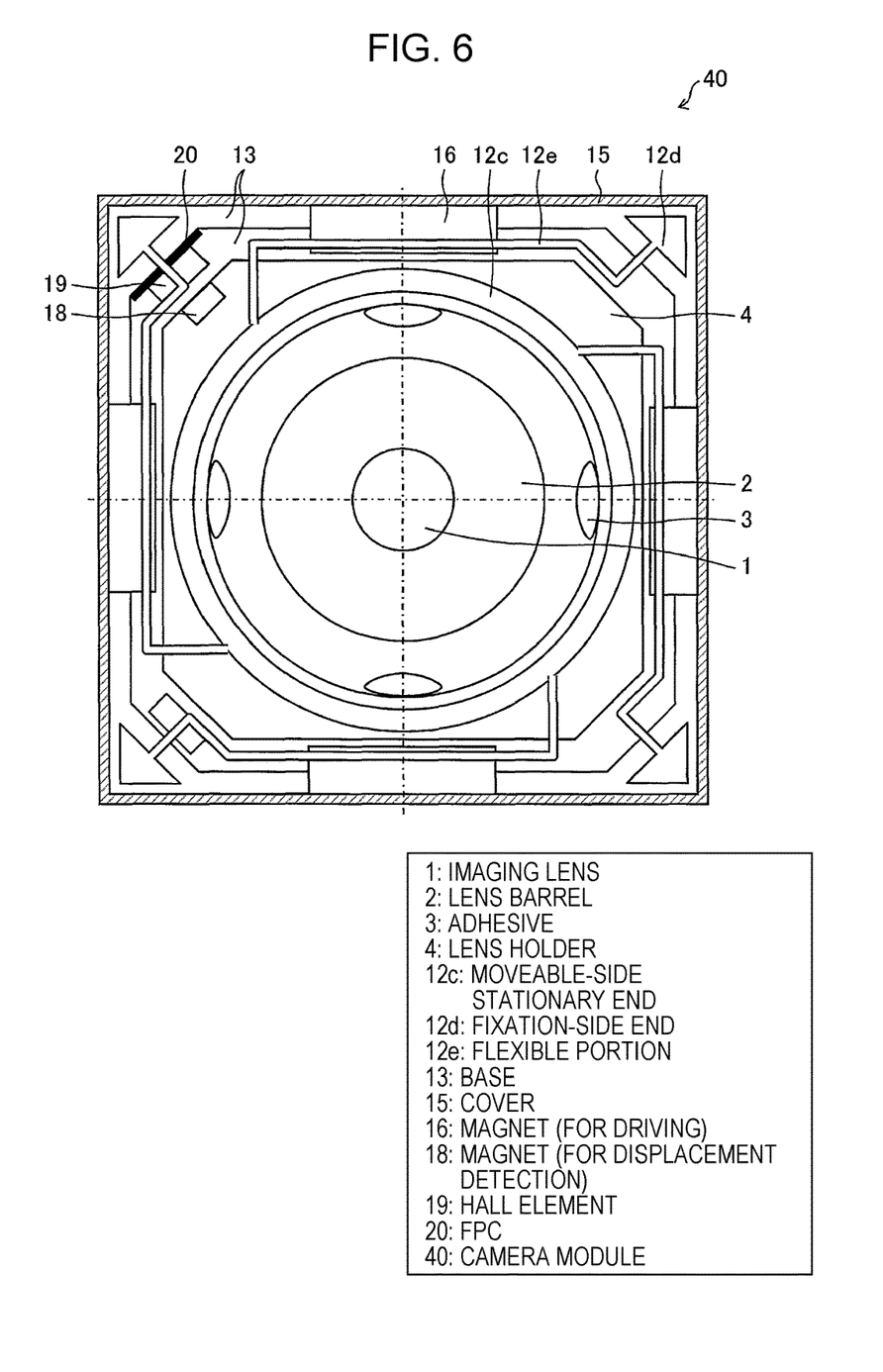
FIG. 6 is a sectional view of the camera module in FIG. 5 taken along line C-C.

A camera module according to a second embodiment of the present invention will be described with reference to FIG. 5 and FIG. 6. FIG. 5 is a sectional view of the camera module according to the second embodiment of the present invention as in FIG. 3. FIG. 6 is a sectional view of the camera module in FIG. 5 taken along line C-C.

The difference between the second embodiment and the first embodiment is that, in a state in which an electric current is not applied to the AF coil 14 (dormant state, a state in which the imaging lens 1 is located at the initial position), the lens holder 4 is not in contact with the base 13, and the movable portion formed of the imaging lens 1, the lens barrel 2, the lens holder 4, the AF coil 14, and so on is supported in mid-air by the AF springs 12a and 12b (elastic bodies). With such a structure, chatter that is made when contact and separation are repeated at short intervals does not occur. However, in the case where the movable portion is subjected to inertial force due to the disturbance vibration and the force is larger than a reaction force created as a result of the deformation of the springs, there is a risk of a collision of the protrusion 4a on the lower surface of the lens holder 4 with the base 13. There is also a risk of a collision of the lens holder 4 with the cover 15, because a space between the lens holder 4 and the cover 15 is narrower than in the first embodiment. Thus, the collision between the movable portion and the stationary portion makes the collision noise, and there is a possibility that intermittent disturbance vibrations result in the collision noise repeatedly occurring.

However, the second embodiment of the present invention includes the units for detecting a displacement in the optical axis direction as in the first embodiment, and feedback control can be implemented such that the position of the movable portion becomes a predetermined position. Accordingly, when the movable portion inside the camera module is subjected to the disturbance vibration from the source of vibration such as a vibrator and is about to be displaced, a driving force in the direction from which the displacement is suppressed is created, even when the camera does not operate. Consequently, an electronic device in which there is no displacement due to the disturbance vibration, that is, the collision noise due to the collision of the movable portion with the stationary portion is not made can be achieved.

[Third Embodiment]

Figure 7:
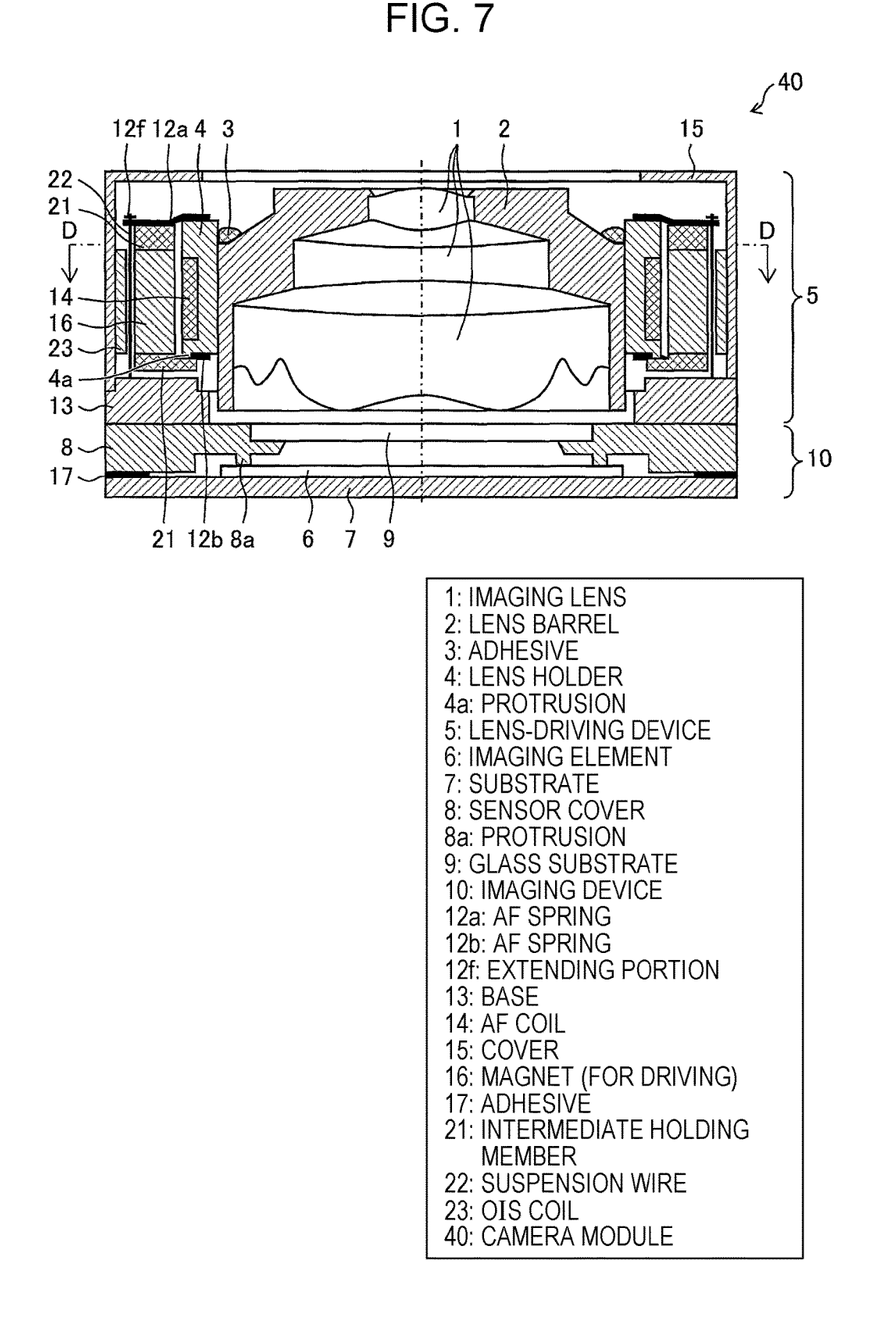
FIG. 7 is a sectional view of a camera module according to a third embodiment of the present invention as in FIG. 3.
Figure 8:
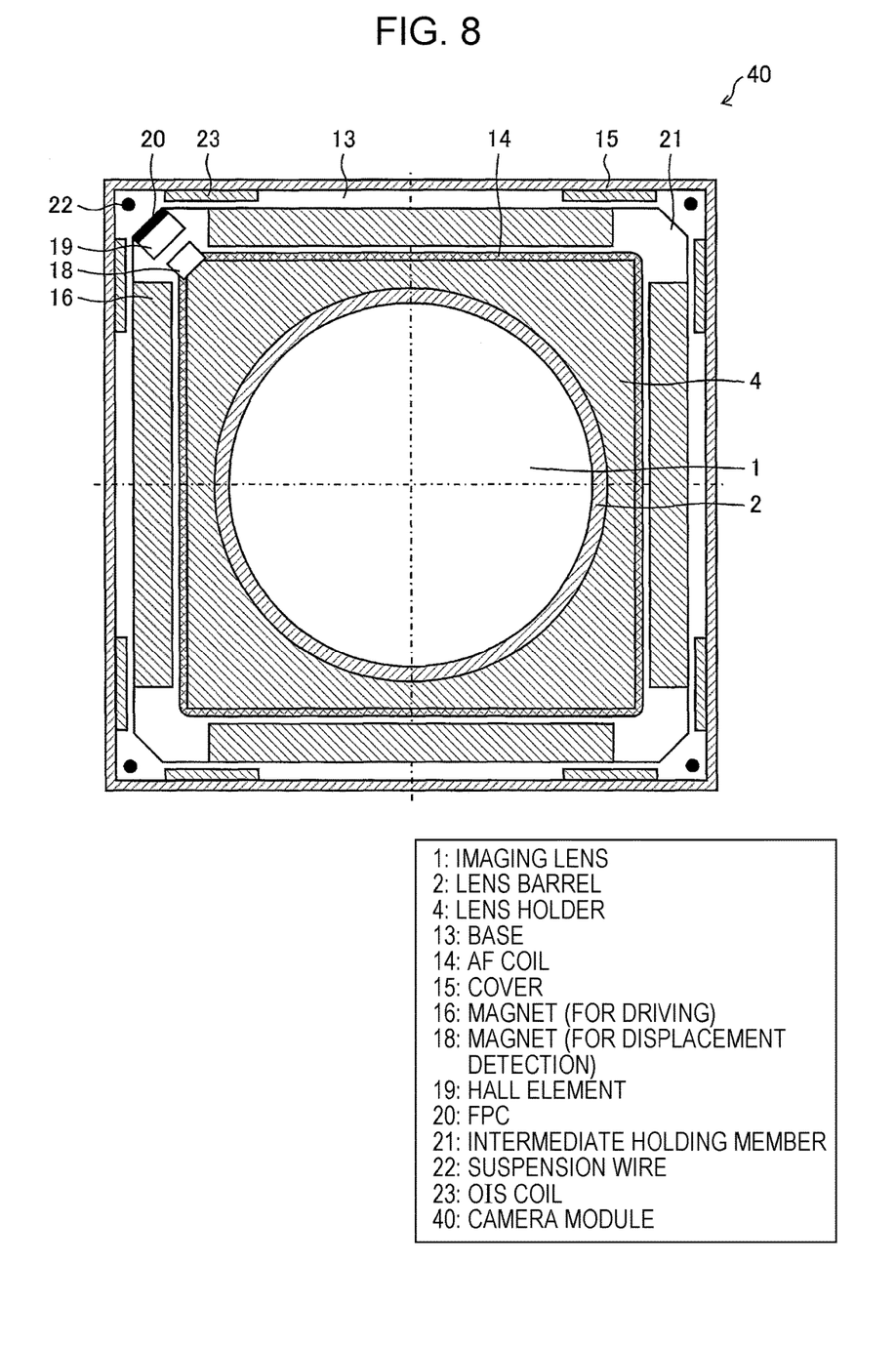
FIG. 8 is a sectional view of the camera module in FIG. 7 taken along line D-D.

A camera module according to a third embodiment of the present invention will be described with reference to FIG. 7 and FIG. 8. FIG. 7 is a sectional view of the camera module according to the third embodiment of the present invention as in FIG. 3. FIG. 8 is a sectional view of the camera module in FIG. 7 taken along line D-D.

The third embodiment differs from the first embodiment in including an optical image stabilization function in addition to an autofocus function. Thus, the present invention can be applied to a camera module including an optical image stabilization function.

The structure of driving parts for autofocus is substantially the same as in the first embodiment. The magnets 16 are not secured to the base 13 but to intermediate holding members 21. The protrusion 4a of the lens holder 4 is in contact with one of the intermediate holding members 21 in a state in which an electric current is not applied to the AF coil 14. The AF spring 12a on the upper side and the AF spring 12b on the lower side are secured at the inside thereof to the lens holder 4 and secured at the outside thereof to the intermediate holding members 21. Part of the AF spring 12a on the upper side extends across the intermediate holding members 21 outward, and the upper ends of suspension wires 22 are secured to an extending portion 12f of the AF spring 12a. The lower ends of the suspension wires 22 are secured to, for example, a substrate (not illustrated) that is part of the base 13. The number of the suspension wires 22 is four. The intermediate holding members 21 are supported by the four suspension wires 22 so as to be movable in the direction perpendicular to the optical axis direction. The number of the suspension wires 22 is not particularly limited.

The magnets 16 for autofocus are also used as magnets (OIS magnets) for optical image stabilization. As illustrated in FIG. 8, eight OIS coils 23 are disposed outside the intermediate holding members 21. The OIS coils 23 are used to move (fluctuate) the movable portion in the X direction and the Y direction. A combination of the OIS coils 23 and the magnets 16 functions as a voice coil motor (VCM). It is only necessary for the OIS coils 23 to be arranged so as to be a predetermined distance away from the magnets 16, and the OIS coils 23 may be disposed, for example, below the intermediate holding members 21 while being secured to the base 13. The number of the OIS coils 23 is not particularly limited.

In the third embodiment, the magnet 18 for displacement detection is secured to the lens holder 4, and the hall element 19 and the FPC 20 are secured to one of the intermediate holding members 21. The FPC 20 is used to energize the hall element 19, and the FPC 20 is connected at another end thereof to, for example, the suspension wires 22 and electricity is conducted to the FPC 20 via the suspension wires 22. In the case where the suspension wires 22 are also used to energize the AF coil 14, the AF coil 14 needs two energizing units, the hall element 19 needs four energizing units, and accordingly, the four suspension wires 22 are insufficient. In this case, the number of the suspension wires 22 is preferably at least six, more preferably eight considering balance.

In the third embodiment, an autofocus portion is substantially the same as in the first embodiment, and the same effects as in the first embodiment can be achieved.

SUMMARY

The camera module (40) according to the first embodiment of the present invention is a camera module including the imaging lens (1), the lens-driving device (5) that drives the imaging lens in the optical axis direction, and the displacement detector (hall element 19) that detects a displacement of the imaging lens. In the case where the displacement detector detects a displacement of the imaging lens that is not based on the drive by the lens-driving device, the lens-driving device drives the imaging lens so as to reduce the displacement.

With the above structure, in the case where the displacement of the imaging lens that is not based on the control of the lens-driving device occurs, the position of the imaging lens is controlled such that the displacement is reduced. Accordingly, the collision noise due to the collision of the movable portion including the imaging lens with the stationary portion can be inhibited from occurring, and the chatter noise due to a slight variation in the state of contact between the movable portion including the imaging lens and the stationary portion can be inhibited from occurring, for example, even in the case where there is an effect of the disturbance vibration due to the source of vibration such as a vibrator or a speaker.

The camera module according to the second embodiment of the present invention may be formed such that, in the first embodiment, the lens-driving device includes the lens holder (4) that holds the imaging lens and the stationary portion (base 13) that is not displaced when the imaging lens is driven, the lens-driving device has an active state in which the lens-driving device drives the imaging lens and a dormant state in which the lens-driving device does not drive the imaging lens, and the lens holder and the stationary portion are in contact with each other in the dormant state.

With the above structure, the collision noise made as a result of the collision of the lens holder with the stationary portion can be suppressed, even in the case where the camera module in the dormant state is affected by the disturbance vibration.

In addition, in the case where the displacement of the imaging lens that is not based on the control of the lens-driving device occurs, the position of the imaging lens is controlled such that the displacement is reduced. Accordingly, the chatter noise made as a result of a slight variation in the state of contact between the lens holder and the stationary portion can be suppressed in a state in which the lens holder is in contact with the stationary portion.

The camera module according to the third embodiment of the present invention may be formed such that, in the first embodiment, the lens-driving device includes the lens holder (4) that holds the imaging lens and the stationary portion (base 13) that is not displaced when the imaging lens is driven, the lens-driving device has an active state in which the lens-driving device drives the imaging lens and a dormant state in which the lens-driving device does not drive the imaging lens, the lens holder is supported by elastic bodies (AF springs 12a and 12b), and the lens holder and the stationary portion are held so as not to come into contact with each other in the dormant state.

With the above structure, since the lens holder and the stationary portion are held so as not to come into contact with each other, the chatter noise can be inhibited from occurring between the lens holder and the stationary portion, even in the case where the camera module in the dormant state is affected by the disturbance vibration.

In addition, in the case where the displacement of the imaging lens that is not based on the control of the lens-driving device occurs, the position of the imaging lens is controlled such that the displacement is reduced. Accordingly, the collision noise made as a result of the collision of the lens holder with the stationary portion can be suppressed in a state in which the lens holder and the stationary portion are held so as not to come into contact with each other.

An electronic device (cellular phone 50) according to a fourth embodiment of the present invention may be equipped with the camera module according to any one of the first to third embodiments.

With the above structure, the collision noise and the chatter noise can be inhibited from occurring, even in the case where the electronic device is equipped with the source of vibration such as a vibrator or a speaker, and the camera module is subjected to the disturbance vibration from the source of vibration.

An electronic device according to a fifth embodiment of the present invention may be formed such that, in the fourth embodiment, the source of vibration (vibrator 60) that electrically operates is included, and the displacement detector operates when the operation of the source of vibration is detected.

With the above structure, when the operation of the source of vibration, such as a vibrator or a speaker, with which the electronic device is equipped is detected, the displacement detector can operate to make a provision against the occurrence of the collision noise and the chatter noise. Accordingly, the power consumption can be decreased more than in the case where the displacement detector always operates.

[Other]

Although an example of a cellular phone is described in the first embodiment, the electronic device including the camera module according to the present invention is not limited to a cellular phone. Examples of the electronic device include a handheld game console and a digital camera.

The present invention is not limited to the embodiments, and various modifications can be made within the range of claims. The technical scope of the present invention includes an embodiment or an example that is obtained by a proper combination of technical features disclosed in the embodiments or examples. The combination of the technical features disclosed in the embodiments enables the formation of a new technical feature.

The present invention can also be represented as follows.

A camera module according to the present invention is a camera module including an imaging element that converts an optical signal into an electrical signal, an imaging lens that causes light to be incident on the imaging element, and a lens-driving device that drives the imaging lens in the optical axis direction for an autofocus action. The lens-driving device includes a displacement detecting unit that detects a displacement of the imaging lens and actuates the displacement detecting unit also when the autofocus action is not performed. In the case where the displacement detecting unit detects a movement signal, the lens-driving device can operate so as to hinder the movement.

The lens-driving device may be formed so as to include a lens holder that holds the imaging lens, and a stationary portion that is not displaced when the imaging lens is driven and such that, in a state in which there is no signal for moving the lens holder, the lens holder is in contact with the stationary portion.

The lens-driving device may be formed so as to include a lens holder that holds the imaging lens, and a stationary portion that is not displaced when the imaging lens is driven and such that the lens holder is supported by an elastic body and, in a state in which there is no signal for moving the lens holder, the lens holder and the stationary portion are held so as not to come into contact with each other.

An electronic device according to the present invention is equipped with the camera module.

The electronic device may be formed so as to include a source of vibration that electrically operates and such that, when the operation of the source of vibration is detected, the displacement detecting unit operates.

INDUSTRIAL APPLICABILITY

The present invention can be applied to a camera module including an autofocus function and an electronic device such as a cellular phone equipped with the camera module.

REFERENCE SIGNS LIST 1 imaging lens
2 lens barrel
3 adhesive
4 lens holder
4a protrusion
5 lens-driving device
6 imaging element
7 substrate
8 sensor cover
8a protrusion
9 glass substrate
10 imaging device
12a AF spring
12b AF spring
13 base
14 AF coil
15 cover
16 magnet (for driving)
17 adhesive
18 magnet (for displacement detection)
19 hall element
20 FPC
21 intermediate holding member
22 suspension wire
23 OIS coil
40 camera module
50 cellular phone
51 housing
60 vibrator (source of vibration)

The invention claimed is:
1. A camera module comprising:
an imaging lens;
a lens-driving device that drives the imaging lens in an optical axis direction; and
a displacement detector that detects a displacement of the imaging lens, wherein
the lens-driving device includes a lens holder that holds the imaging lens, and a stationary portion that is not displaced when the imaging lens is driven, the lens-driving device has an active state in which the lens-driving device drives the imaging lens and a dormant state in which the lens-driving device does not drive the imaging lens, in the active state, in a case where the displacement detector detects a displacement of the imaging lens with respect to a target position, which displacement is not based on driving by the lens-driving device to cause the imaging lens to move to the target position, the lens-driving device drives the imaging lens so as to reduce the displacement of the imaging lens with respect to the target position, and in the dormant state, the lens holder and the stationary portion are in contact with each other, the lens holder and the stationary portion are subjected to a contact pressure due to a preload applied by an elastic body and the imaging lens is located at an initial position, and in a case where the displacement detector detects a displacement of the imaging lens with respect to the initial position, the lens-driving device transits from the dormant state to the active state so that the target position to which the lens-driving device drives the imaging lens is the initial position.

2. An electronic device comprising the camera module according to claim 1.

3. A camera module, comprising:

an imaging lens;

a lens-driving device that drives the imaging lens in an optical axis direction; and a displacement detector that detects a displacement of the imaging lens, wherein the lens-driving device includes a lens holder that holds the imaging lens, and a stationary portion that is not displaced when the imaging lens is driven, the lens holder is supported by an elastic body, wherein the lens-driving device has an active state in which the lens-driving device drives the imaging lens and a dormant state in which the lens-driving device does not drive the imaging lens, in the active state, in a case where the displacement detector detects a displacement of the imaging lens with respect to a target position, which displacement is not based on driving by the lens-driving device to cause the imaging lens to move to the target position, the lens-driving device drives the imaging lens so as to reduce the displacement of the imaging lens with respect to the target position, and in the dormant state, the lens holder and the stationary portion are held so as not to come into contact with each other, the imaging lens is located at an initial position, and in a case where the displacement detector detects a displacement of the imaging lens with respect to the initial position, the lens-driving device transits from the dormant state to the active state so that the target position to which the lens-driving device drives the imaging lens is the initial position.

4. The electronic device according to claim 2, further comprising: a source of vibration that electrically operates, wherein, when the operation of the source of vibration is detected, the displacement detector operates.

5. An electronic device comprising the camera module according to claim 3.

6. The electronic device according to claim 5, further comprising:

a source of vibration that electrically operates, wherein when the operation of the source of vibration is detected, the displacement detector operates.

* * * * *